United States Patent

[11] 3,616,142

[72] Inventor Albert Schrotenboer
 Grand Rapids, Mich.
[21] Appl. No. 762,813
[22] Filed Sept. 26, 1968
[45] Patented Oct. 26, 1971
[73] Assignee Sackner Products, Inc.
 Grand Rapids, Mich.

[54] STRUCTURAL LAMINATE FOR SEATING AND THE LIKE
 7 Claims, 6 Drawing Figs.
[52] U.S. Cl.................................................. 161/71,
 161/72, 161/78, 161/85
[51] Int. Cl..................................................... D03d 3/00,
 B32b 5/02
[50] Field of Search.........................................161/140–144,
 78, 82, 84, 85, 170, 53, 151, 71, 72

[56] References Cited
 UNITED STATES PATENTS
 874,494 12/1907 Freese........................... 161/141
 1,645,858 10/1927 Hayes............................ 161/82
 1,984,814 12/1934 Sherman....................... 161/141
 2,221,507 11/1940 Clark............................ 161/142
 2,780,572 2/1957 Carlson......................... 161/85

Primary Examiner—Douglas J. Drummond
Attorney—Price, Heneveld, Huizenga & Cooper ABSTRACT: This disclosure relates to a structural laminate useful for constructing upholstered items such as furniture and seating for vehicles and the like. The laminate comprises a relatively thick layer of cushioning material and a bottom layer formed of a plurality of spaced, relatively stiff strips of material held together and to the side of the cushioning material by a loosely woven or knit web of starched woven material.

There is also disclosed a laminate-making process comprising the steps of applying glue to flat longitudinal strips, continuously feeding a plurality of the glued strips to the top of a web of padding to form a layer of glue strips on the batting, continuously applying glue to a web of woven material, applying the glued web of woven material to the layer of glued longitudinal strips, and compressing the laminate thus formed.

INVENTOR.
ALBERT SCHROTENBOER

INVENTOR.
ALBERT SCHROTENBOER
BY
ATTORNEYS

STRUCTURAL LAMINATE FOR SEATING AND THE LIKE

This invention relates to a structural laminate. In one of its aspects it relates to a structural laminate comprising a soft cushioning material, a plurality of spaced, stiffened strips of material at one side of the cushioning material, and a web of interlaced material secured to the stiffening strips and to the side of the soft cushioning material.

In another of its aspects, the invention relates to a process of making a structural laminate comprising the steps of compressing together a layer of soft cushioning material with a layer of glued, spaced, parallel strips ans a layer of loosely interlaced filaments or yarns.

Upholstered furniture is conventionally constructed with a frame, springs, insulating material, cushioning material, and an upholstery fabric. The insulating and cushioning material is positioned between the springs and the upholstery fabric. It has been conventional practice to use woven wire shaped to fit particular furniture structures as insulating material. FOam rubber or cotton batting have then been used as the soft cushioning material and positioned on top of the insulating wire. In this manner, the springs are prevented from penetrating the cushioning material and the fabric. The cushioning material insulates the wire from the upholstery fabric. When he wire is used as the insulator from the springs, the wire contacts the metal springs and makes a noisy joint due to the metal-to-metal contact. Further, the metal wire sometimes requires a "hog ring" operation or overlapping of the wire insulator to make the wire fit a particular size or configuration of springs.

Attempts have been made to reduce the cost of the insulating material. For example, cotton net has been substituted for the metal wire. However, this has been unsuccessful since the springs can penetrate the cotton net and go through the cushioning material.

I have now discovered a new and improved insulating laminate which is noise-free and can be cut to any size or shape without regard to spring orientation. The laminate comprises a relatively thick layer of soft cushioning material with a plurality of spaced, stiff, longitudinal flat strips on one side of the insulation and a loosely woven sheet of material holding the flat strips to the soft insulating material.

By various aspects of this invention, one or more of the following, or other, objects can be obtained.

It is an object of this invention to provide a new insulating material for use between the covering and the springs of upholstered furniture, which insulating material can be cut to size or shape without regard to spring orientation.

It is a further object of this invention to provide an insulating material for springs and the like having a noise-free property, even when installed between metal springs and upholstery fabric in upholstered furniture.

It is a further object of this invention to provide a single laminate for use in upholstered furniture construction, which laminate can be cut and installed between the springs and the fabric covering without other padding and in a single operation.

It is a still further object of this invention to provide an orientation resistant insulating material for use between springs and upholstery fabric in upholstered furniture.

It is yet another object of this invention to provide a method of making an insulating laminate for use in upholstery furniture construction.

Another object of this invention is to provide an upholstered furniture construction which is durable, yet easy and inexpensive to construct, and has noise-free properties.

Other aspects, objects, and the several advantages of this invention are apparent to one skilled in the art from a study of this disclosure, the drawings, and the appended claims.

According to the invention, there is provided a structural laminate useful in making upholstered furniture in which springs are employed. The laminate comprises a sheet formed of a soft cushioning material of substantial thickness, a plurality of laterally spaced elongated flat strips adhering to one surface of the sheet, and a sheet of interlaced continuous filaments or yarns secured to the one surface of the soft cushioning material and to the elongated strips.

Preferably, the sheet of soft cushioning material is a fibrous cotton batt. In a preferred embodiment the elongated strips comprise Kraft paper folded over upon itself and impregnated with a stiffening adhesive. Still further, the sheet of interlaced filaments comprises a loosely woven cotton mesh impregnated with starch. Preferably, the components are glued together to form the composite laminate.

The invention will now be described with reference to the accompanying drawings in which.

Figure 1:
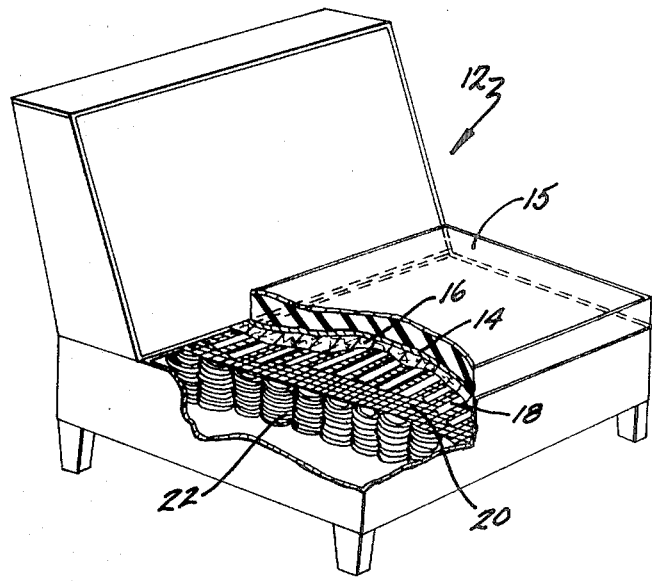
FIG. 1 is a perspective view of an upholstered chair partially cut away to show the construction thereof.
Figure 2:
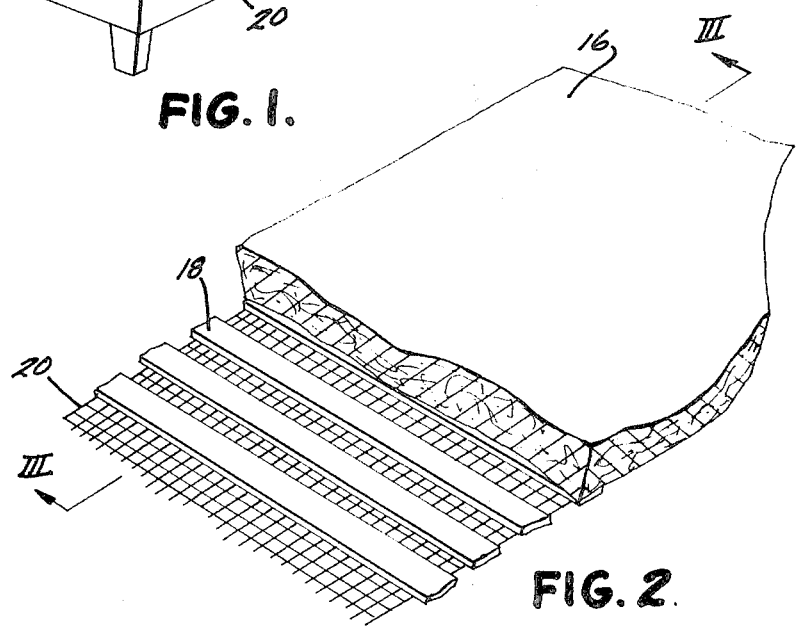
FIG. 2 is a perspective view of the laminate according to the invention.
Figure 3:
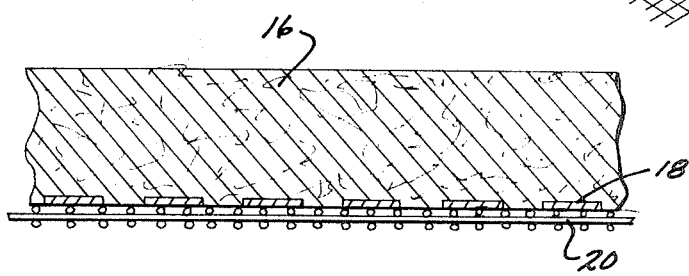
FIG. 3 is a cross-sectional view of the laminate shown in FIG. 2 taken along lines III—III of FIG. 2.

Referring now to the drawings and to FIGS. 1–3 in particular, a chair 12 is shown broken away to show its construction. The chair has a frame which supports a plurality of springs 22. The springs have positioned on top of them a laminate comprising a loosely woven mesh layer 20, a layer of stiff backing strips 18, and a cushioning layer 16. On top of the laminate which is generally held in place by hog rings passing through the laminate and around the spring elements is a cover of material 14 and placed on top of the covering 14 is cushion 15.

The laminate can be more clearly seen in FIGS. 2 and 3. The stiff backing strips 18 comprise a plurality of relatively flat parallel spaced strips of material. The open mesh layer 20 holds the stiff backing strips 18 against the cushioning layer 16.

The mesh layer 20 is preferably a sized cotton net which can be woven or knitted to produce a pattern with one-eighth to one-fourth inch openings. The net is preferably starched to give it stiffness. Within the broadest aspect of this invention, several types of material can be used to hold the stiff flat strips in place beneath the cushioning layer and to hold the cushioning layer together. The material should also provide sufficient stiffness to the bottom of the laminate. Other suitable materials would by synthetic woven or knitted meshes made from materials such as nylon, polyethylene, polypropylene and the like. An example of the preferred mesh is with Cottonet, sold by Swift Manufacturing Company.

Figure 4:
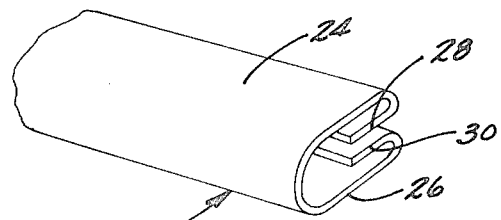
FIG. 4 is an exploded perspective view of the elongated strips illustrating their method of manufacture.

Preferably, the stiff backing strips 18 are formed from strips of Kraft paper which are folded as illustrated in FIG. 4. The sides 28 and 30 are folded inwardly along a longitudinal seam and then the central portions 24 and 26 are folded inwardly to bring sides 28 and 30 into contact with each other. Preferably, the Kraft paper is impregnated with an acrylic adhesive in order to stiffen it. The Kraft paper is then rolled down to the flat form shown in FIGS. 2 and 3. Within the broadest aspect of this invention, other materials such as twisted cord compressed into flat strips, metal strips wrapped with paper, plastic strips or other suitable stiff materials can be employed. The function of the stiff flat strips is to give sufficient stiffness to the laminate to prevent the springs from penetrating through the mesh and cushioning layer. In the preferred embodiment, the flat strips are parallel and spaced from each other. Alternately, the flat strips can be transverse to each other or can cross each other.

The width of the strips can also vary depending on the size of the springs and the desired end use. Generally, the width will be in the range of one-half to 2 inches, and each strip will be placed three-fourths to 3 inches apart.

The cushioning layer 16 of material preferably is a Cotton-flote or other similar resinated cotton fibrous batt. Other such as foam rubber, fiberglass batt, wool batt and the like can be used. Cotton-flote is a blend of cotton linters made from high-grade cotton obtained from the extraction of cottonseed oil from cotton hulls to produce short fibers. THe fibers are generally in the range of one-half to 1 and one-half inch long and can be blended with from 10 to 20 percent synthetic fibers. An example of Cotton-flote is disclosed in U.S. Pat. No. 3,181,225.

The thickness of the cushioning layer can vary depending on the end use but will generally be in the range of one-fourth to 2 inches in thickness. The function of the cushioning material is to provide a cushion between the springs and the fabric cover.

Figure 6:
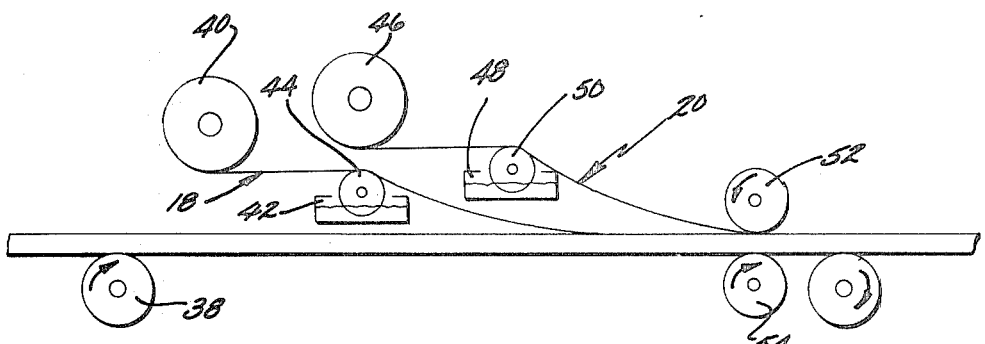
FIG. 6 is a schematic illustration of making the laminate according to the invention.

A method of making the laminate is schematically illustrated in FIG. 6. A web of cushioning material 16 is passed continuously over roller 38. A plurality of parallel, stiff, backing strips 18 of Kraft paper are unwound from the large reel or spool 40, passed over glue applying roller 44 and onto the web of cushioning material 16. The glue-applying roller 44 applies the glue from a glue bath 42. The mesh web 20 is fed from a reel or spool 46 over a glue-applying applicator roller 50 and onto the top of the flat strips of backing strips 18. A blue bath 48 is provided for supplying glue to the roller 50. The combined laminate comprising the three layers is then passed through compression rollers 52 and 54 which compress the laminate to aid in adhesively securing the three layers together.

Figure 5:
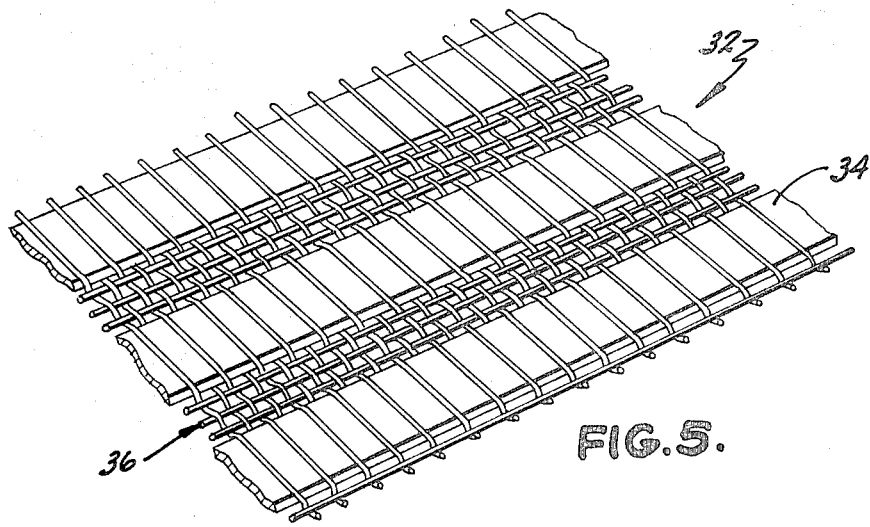
FIG. 5 is a perspective view of a modification of the bottom layer of the laminate.

The bottom layer of the laminate comprising the mesh web 20 and backing strips 18 can also be constructed by weaving the stiff-backing layers into the open mesh layer as illustrated in FIG. 5. Referring now specifically to FIG. 5, a modified backing layer 32 is shown. THe stiff flat strips 34, constructed of the same material as strips 18, are woven into the mesh layer 36, which is of the same material as web 20, to form a plurality of spaced, elongated flat strips within the mesh layer 36. This combination of strips 34 and mesh web 36 is then applied to a cushioning material such as that shown and described as cushion 16 in a similar way to that previously described in relation to FIG. 6.

In using the above described laminate in upholstering seats such as for furniture and automobiles, the entire laminate is placed on the spring units with the mesh web 20 on the bottom contacting the springs. This installation can be done in one step rather than in several steps as has been practiced by prior types of pads and insulators. Therefore, there is a tremendous saving in labor while at the same time providing a superior product as will be described hereinafter.

It should be understood that this laminate can be cut to be used on various sizes and shapes of furniture as contrasted to the conventional type of seat-insulator constructions wherein the insulator is constructed of wire, the loose end of which, if cut, sticks out and in many cases, the entire assembly will fall apart. My laminate can be cut at any place without adversely affecting its ability to serve as an insulator and pad.

To my knowledge, most insulators are constructed of metal and this metal, when it contacts the springs, produces a squeak due to the metal-to-metal contact. Further, metal insulators are subject to rust which eventually will show through and, in fact, fail after a length of time. My laminate does not have these disadvantages.

Another advantage of my pad and insulator combination is that the hog rings can be secured at any place. This is contrary to the conventional type of insulator and pad wherein the hog rings can be secured only at certain points where the wires and cords cross and are secured together.

My invention also eliminates the problems of orientation which are present in the use of wires, particularly with the zig-zag-type springs. In most constructions it is necessary that the wire insulation be oriented relative to the springs for particular types of furniture, whereas with my construction the laminate can be used without regard to spring orientation and still it produces the desired result. All in all, my construction provides a unique, versatile, neat, and easily usable pad and insulator combination with the many advantages described above.

The embodiments of an invention in which an exclusive property or privilege is claimed are defined as follows:

1. A laminate useful in making upholstered furniture and the like in which springs are employed comprising:
    a sheet formed of cushioning material;
    a plurality of closely spaced elongated stiff flat strips adhering to one surface of said sheet, said spacing being less than about three inches; and
    a sheet of interlaced continuous filaments secured to said one surface of said cushioning material and to said elongated strips.

2. A laminate according to claim 1 wherein said sheet of cushioning material is a fibrous cotton batt.

3. A laminate according to claim 1 wherein said elongated strips comprise Kraft paper folded over on itself and impregnated with stiffening adhesives.

4. A laminate according to claim 1 wherein said elongated strips are woven into said sheet of interlaced continuous filaments.

5. A laminate according to claim 1 wherein said sheet of interlaced filaments comprises a loosely woven cotton mesh impregnated with starch.

6. A laminate according to claim 1 wherein said sheet of interlaced filaments comprises a loosely woven net of cotton material impregnated with starch.

7. A laminate according to claim 1 wherein said stiff flat strips are spaced from and parallel to one another.

* * * * *